United States Patent [19]

Blum

[11] 4,139,579
[45] Feb. 13, 1979

[54] APPARATUS FOR INTRODUCING AIR INTO A LIQUID INCLUDING A LIQUID PUMP MOUNTED WITHIN AN AERATOR PRESSURE CHAMBER

[76] Inventor: Albert Blum, Scheiderhöhe, 5204 Lohmar 1, Fed. Rep. of Germany

[21] Appl. No.: 816,025

[22] Filed: Jul. 15, 1977

[51] Int. Cl.² .............................................. B01F 3/04
[52] U.S. Cl. ...................................... 261/29; 210/219; 261/76; 261/93; 415/207; 417/84
[58] Field of Search ...................... 261/29, 34 R, 36 R, 261/76, 87, 91, 93, 121 M, DIG. 75; 417/76, 84; 210/219, 220, 221 M; 415/204, 206, 207

[56] References Cited

U.S. PATENT DOCUMENTS

| | | | |
|---|---|---|---|
| 2,189,779 | 2/1940 | Daman | 261/93 X |
| 2,280,979 | 4/1942 | Rocke | 261/93 |
| 2,388,753 | 11/1945 | Mallmann et al. | 261/DIG. 75 |
| 2,555,686 | 6/1951 | Farrelly et al. | 261/36 R |
| 3,278,170 | 10/1966 | Moritz | 261/93 X |
| 3,671,022 | 6/1972 | Laird et al. | 261/29 |
| 3,829,070 | 8/1974 | Reba et al. | 261/36 R X |
| 3,904,393 | 9/1975 | Morse | 261/DIG. 75 |
| 3,927,152 | 12/1975 | Kyrias | 261/DIG. 75 |

FOREIGN PATENT DOCUMENTS

| | | | |
|---|---|---|---|
| 2516371 | 10/1975 | Fed. Rep. of Germany | 261/DIG. 75 |
| 1221022 | 2/1971 | United Kingdom | 261/93 |

*Primary Examiner*—Richard L. Chiesa
*Attorney, Agent, or Firm*—Diller, Ramik & Wight

[57] ABSTRACT

An apparatus for introducing air into a liquid including an aerator housing having inner and outer walls defining an inner pressure chamber and an outer air chamber with jet nozzles being carried by the inner walls and opening radially outwardly for directing liquid jets from the pressure chamber through the air chamber, catching nozzles carried by the outer wall and opening outwardly therefrom in alignment with the jet nozzles for receiving a combined liquid and air flow therefrom, a driven liquid pump in the pressure chamber and a compressed air generator driven by a motor and carried thereby, and an air conduit leading from the compressed air generator into the air chamber.

8 Claims, 4 Drawing Figures

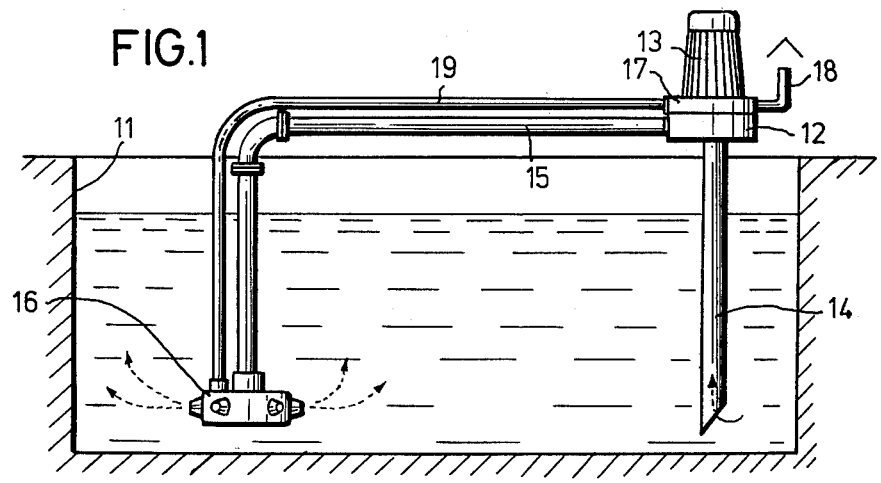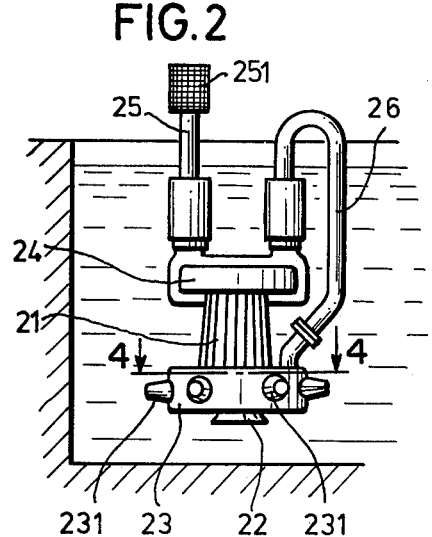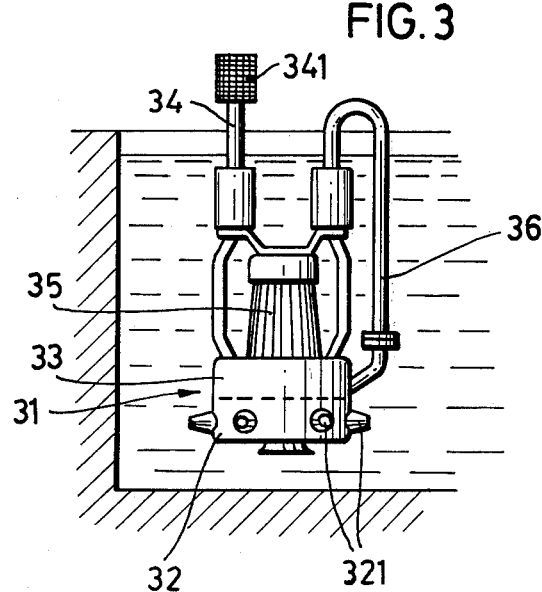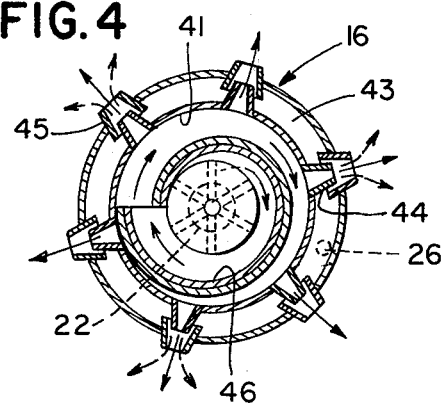

APPARATUS FOR INTRODUCING AIR INTO A LIQUID INCLUDING A LIQUID PUMP MOUNTED WITHIN AN AERATOR PRESSURE CHAMBER

This invention ralates to a method and an apparatus for introducing air into liquids, especially for the aeration of waste water.

The invention concerns a method for introducing air into liquids, especially waste waters, in which a partial quantity of the liquid to be aerated is continuously extracted and charged under pressure into a space, chamber or the like, from which it can issue in many directions in the form of liquid jets, each of which, after passing a space filled with air or another gas, is collected by catching nozzles which are allocated to the individual jets and return these together with the entrained air into the quantity of liquid. The invention further relates to an apparatus working specially according to the method in accordance with the invention for introducing air into liquids which possesses a pressure chamber connectable to the delivery side of a pump, an air chamber at least partially surrounding the pressure chamber and connectable to an air or gas supply conduit, jet nozzles arranged in the wall between pressure chamber and air chamber and catching nozzles arranged in the outer wall of the air chamber and allocated to the jet nozzles.

In such aeration methods and apparatuses, the quantity of air introduced depends upon how much air is entrained in the passage of the water jets through the air filled space. An increase of regulation is possible only with difficulty and within narrow limits, if at all. These drawbacks and difficulties are to be eliminated by the invention and a method and an apparatus for the introduction of air into liquids are to be produced in which the quantity of air to be introduced can be increased almost as desired and regulated especially within wide limits in a simple manner, for example being adjustable by simple exchange of parts.

To solve this problem, in a method of the initially stated kind for the introduction of air into liquids, especially waste waters, the invention provides that the space through which the liquid jets are conducted from their emergence to recollection is placed under pressure and the pressure may be regulable or adjustable. When air is used the compressed air per se can be produced by any suitable compressed-air generator. It is however expedient to combine an apparatus of the initially stated kind which is to serve especially for carrying out the method according to the invention with a compressed-air generator and to use the same motor for the drive of pump and compressed-air generator. For many reasons here the pump, compressed-air generator and drive motor should be combined to form one assemblage which can be immersed in the liquid to be aerated. In such a case it can be expedient to arrange the pump beneath the motor and the compressed-air generator thereabove. It is however also possible to combine the pump and compressed-air generator into one constructional unit in which the pump and compressed-air generator may be arranged in separate chambers of one common housing and drivable by one motor. Here the drive of one part, especially the compressed-air generator, may take place through an intermediate gearing which again may be regulable or adjustable.

The invention permits of many possible embodiments. The invention will be explained in greater detail hereinafter with reference to apparatuses serving for its execution, which are conceived only as examples of embodiment, by reference to the accompanying drawings, wherein:

FIG. 1 shows a first form of embodiment with pump arranged outside the liquid to be aerated and compressed-air generator connected therewith, FIG. 2 shows a second possible embodiment in which the aerator and compressed-air generator are driven by opposite ends of the drive shaft of a motor, FIG. 3 shows a third possible embodiment in which the pump and the compressed-air generator are arranged in separate chambers of one common housing.

FIG. 4 is a horizontal sectional view through the aerator of FIG. 2 taken along the line 4—4.

In the drawings, in the form of embodiment of an aeration apparatus according to FIG. 1 serving for the aeration of waste waters situated in a waste water basin 11, with the aid of a pump 12 driven by a motor 13, waste water is sucked in through the suction conduit 14 and delivered through the delivery conduit 15 to an aerator 16. With the motor-pump assemblage 12, 13 there is coupled a compressed-air generator 17 which sucks in air through the suction conduit 18 and supplies it under pressure to the aerator 16 through the delivery conduit 19. Water and air then issue at the external periphery of the aerator.

In the apparatus as illustrated in FIG. 1 the quantity of the air fed to the aerator 16 is not adjustable or regulable independently of the water quantity, unless parts of the compressed-air generator are replaced in order to increase or decrease its delivery quantity. If however two separate drive systems, which may be derived from the same motor, are used to drive the pump 12 and the compressed-air generator 17, it is also possible to achieve an adjustment or regulation of the air quantity in comparison with the water quantity.

In the form of embodiment according to FIG. 2 the pump driven by the motor 21, which sucks in the liquid to be aerated through the suction opening 22, is inserted into the internal space of the aerator 23 of annular formation. The motor 21 serves at the same time to drive a compressed-air generator 24 arranged thereabove, which sucks in air through the suction opening 25 with the air filter 251, which air is fed through the delivery conduit 26 to the aerator 23, where it emerges together with the liquid through the nozzles 231. The compressed-air generator can be driven directly or through an intermediate gearing by the motor shaft, whereby the possibility is obtained of adapting the liquid quantity and air quantity to one another. The arrangement of the compressed-air generator, which in the present case possesses a water-tight style of construction, within the quantity of liquid to be aerated permits in a simple way of achieving a good reduction of noise.

In the form of embodiment according to FIG. 3 the pump and compressed-air generator are combined into a construction unit 31 which can be immersed in the liquid and is driven by a motor 35 which can be formed as submersible motor. As indicated by the broken line, the housing 31 is divided into two chambers 32 and 33 of which the chamber 32 accommodates the pump with the aerator part and the other chamber 33 accommodates the compressed-air generator. The air is fed to the compressed-air generator through the suction conduit 34 with the air filter 341 and forced through the delivery conduit 36 into the aerator, from the nozzles 321 of which it emerges together with the pumped-around liquid into the liquid quantity to be aerated.

Referring now to FIG. 4, it will be seen that the aerator 16 has an inner pressure chamber 40 defined by an inner wall 41. Between the inner wall 41 and an outer wall 42 is an air chamber 43 which surrounds the pressure chamber 40. Liquid under pressure is pumped into the pressure chamber 40 through the intake 22 by a pump member 46 mounted therein and driven by motor 21 and exits therefrom radially through jet nozzles 44, each of which is aligned with a catching nozzle 45 carried by and opening through the outer wall 42. Compressed air is directed into the air chamber 43 through conduit 26. This liquid passing through the air chamber 43 is aerated.

What I claim is:

1. Apparatus for introducing air into a liquid, said apparatus comprising an assembly including a motor, an aerator coupled to said motor as a unit, said aerator including a housing having inner and outer walls defining an inner pressure chamber and an outer air chamber, jet nozzles carried by said inner walls and opening radially outwardly for directing liquid jets from said pressure chamber through said air chamber, catching nozzles carried by said outer wall and opening outwardly therefrom, each catching nozzle being aligned with one of said jet nozzles for receiving a combined liquid and air flow therefrom, liquid pump means coupled to said motor for driving thereby, said liquid pump means being mounted in said pressure chamber, a compressed air generator mounted on said motor and driven thereby, and an air conduit leading from said compressed air generator into said air chamber.

2. An apparatus according to claim 1 characterized in that said pump, compressed air generator and drive motor can be immersed in the liquid to be aerated.

3. An apparatus according to claim 2 characterized in that the pump is arranged beneath the motor and the compressed air generator is arranged thereabove.

4. An apparatus according to claim 3 characterized in that the drive of said compressed air generator takes place through an intermediate gearing which is adjustable.

5. An apparatus according to claim 2 characterized in that said pump and compressed air generator are arranged in separate chambers of one common housing.

6. An apparatus according to claim 1 characterized in that the pump is arranged beneath the motor and the compressed air generator is arranged thereabove.

7. An apparatus according to claim 1 characterized in that said pump and compressed air generator are arranged in separate chambers of one common housing.

8. An apparatus according to claim 1 characterized in that the drive of said compressed air generator takes place through an intermediate gearing which is adjustable.

* * * * *